(12) United States Patent
Usenko

(10) Patent No.: US 10,921,491 B2
(45) Date of Patent: Feb. 16, 2021

(54) METHOD OF MAKING A SURFACE WITH IMPROVED MECHANICAL AND OPTICAL PROPERTIES

(71) Applicant: Alexander Yuri Usenko, Lake Saint Louis, MO (US)

(72) Inventor: Alexander Yuri Usenko, Lake Saint Louis, MO (US)

( * ) Notice: Subject to any disclaimer, the term of this patent is extended or adjusted under 35 U.S.C. 154(b) by 111 days.

(21) Appl. No.: 16/282,579

(22) Filed: Feb. 22, 2019

(65) Prior Publication Data
US 2019/0265391 A1 Aug. 29, 2019

Related U.S. Application Data

(60) Provisional application No. 62/634,849, filed on Feb. 24, 2018.

(51) Int. Cl.
*G02B 1/118* (2015.01)
*G02B 1/12* (2006.01)
*G02B 1/14* (2015.01)

(52) U.S. Cl.
CPC ............... *G02B 1/118* (2013.01); *G02B 1/12* (2013.01); *G02B 1/14* (2015.01)

(58) Field of Classification Search
CPC ................................. G02B 1/12; G02B 1/118
See application file for complete search history.

(56) References Cited

U.S. PATENT DOCUMENTS

| | | | |
|---|---|---|---|
| 2008/0318757 A1* | 12/2008 | Fotou | C03C 3/066 501/29 |
| 2010/0118390 A1* | 5/2010 | Blair | G02B 5/008 359/346 |
| 2011/0051251 A1* | 3/2011 | Endoh | G02B 27/0018 359/614 |
| 2011/0149399 A1* | 6/2011 | Peng | G02B 1/118 359/580 |
| 2012/0281292 A1* | 11/2012 | Baca | G02B 1/113 359/601 |

(Continued)

FOREIGN PATENT DOCUMENTS

CN 104465118 A * 3/2015

OTHER PUBLICATIONS

Cai et al., "Recent advances in antireflective surfaces based on nanostructure arrays", Mater. Horiz., 2015, 2, 37-53 (Year: 2015).*

*Primary Examiner* — Charlie Y Peng

(57) ABSTRACT

A process for preparing a surface of an optical article to improve light reflection and light transmission properties while conserving mechanical properties as durability and scratch resistance of the surface. A blank film is deposited on a base article. The film is post processed to convert a flat surface into near close packed array of near hemispherical protuberances. The conversion done in 2 steps. First the film is scratched to honeycomb pattern. Second the article is annealed. The anneal causes sequential transformation of flat film into the array. The transformation starts from scratch lines and go to a center of each honeycomb island cell. It is driven by dewetting phenomena. Characteristic size of the protuberances is controlled by initial film thickness. For low reflectivity of visible light, the initial blanket film is near 150 nm thick.

10 Claims, 3 Drawing Sheets

(56) References Cited

U.S. PATENT DOCUMENTS

| | | | |
|---|---|---|---|
| 2013/0194668 A1* | 8/2013 | Liang | C03C 1/008 |
| | | | 359/586 |
| 2018/0067235 A1* | 3/2018 | Ollier | F24S 70/30 |
| 2019/0109011 A1* | 4/2019 | Checco | G02B 1/118 |

* cited by examiner

METHOD OF MAKING A SURFACE WITH IMPROVED MECHANICAL AND OPTICAL PROPERTIES

REFERENCE TO RELATED APPLICATIONS

This application claims an invention which was disclosed in Provisional Application No. 62/634,849, filed Feb. 24, 2018, entitled "Method of making a surface with improved mechanical and optical properties". The benefit under 35 USC § 119(e) of the United States provisional application is hereby claimed, and the aforementioned application is hereby incorporated herein by reference.

BACKGROUND OF THE INVENTION

Field of the Invention

The invention relates to methods of modifying surfaces toward lowering light reflection from the surface while keeping mechanical properties as wear and scratch resistance. The method uses self-assembly technique to convert a blanket film into a structured film with a moth-eye like morphology. Using the self-assembly enables an economical manufacturing of such surfaces.

Description of Related Art

An interface between air and plain glass reflects roughly 4% of incident light. This is an undesirable effect in the most of applications. For example, due to the reflection, images on displays of smartphones are not well visible in sunny day conditions. In addition, for example, light reflections from car windows worsen driving safety.

In the art, many methods are known how to reduce the light reflection from surfaces. The most widely used is a method described by Alexander Smakula, "Verfahren zur Erhöhung der Lichtdurchlässigkeit optischer Teile durch Erniedrigung des Brechnungsexponenten an den Grenzflächen dieser optischen Teile", German Patent 685 767 (1935). In this method, a blanket film with a thickness ¼ of wavelength of interest is deposited onto glass or another surface. Mechanical properties of this surface are usually good as these are determined by mechanical properties of the quarter-wavelength blanket film. However, light reflectivity is low only in a narrow range of wavelengths. Usually, reflectivity for green light (520-560 nm) is minimized and accounts a portion of percent, while for red (750 nm) and violet (380 nm) the reflectivity is still high. Moreover, this method works well for incident angles of light near 90 degrees but fail for sharper angles.

Another method known in the art is coating the surface with a blanket film having gradually changing refraction coefficient. At the top of the blanket film, the refraction is equal to air—1.0, and at the bottom, the refraction coefficient is equal to substrate (1.4-1.5 for the most of glasses). The antireflection properties of this surface are near ideal—a small fraction of percent for all wavelength range of interest (visible light) and for wide range in angles of the incident light.

One of way to make the blanket film with gradually changing refraction coefficient is to deposit a blanket film with gradually decreasing porosity from the top to the bottom of the blanket film. Such blanket films, however, are not widely used as they have low mechanical quality. The top of the blanket film must have high porosity, and therefore is easy gets scratched or otherwise damaged.

A surface that combines good optical (low reflectivity) and good mechanical (wear resistance) properties thus needed.

Methods of making such surfaces are known in the art. One widely used method is making surface similar in morphology to corneal surface in moths—night insects. Usually these referred as moth-eyes. This surface can be described as an array of densely packed protuberances (nipples, protrusions, etc.). If not densely packed—the effect wears off. Each individual protuberance has near paraboloid shape. And all protuberances are near the same in size. Characteristic size (diameter) must be just slightly smaller than ½ of the shortest wavelength of interest. Light interfere but not reflect from such small enough feature. For visible light, the shortest is violet—near 400 nm. Therefore, an ideal surface has to have 200 nm or slightly smaller sized protuberances. In nature, many biological species that needs low reflectivity/high transmissivity (night fauna, all night insects) have the same near 200 nm-structured film eye surfaces. All that has governed by sun light properties and by evolution of flora and fauna.

This surface is similar to a blanket film with gradually changing porosity in a sense that its refraction coefficient gradually changes. However, the scale of porosity, in a sense, is maximized, thus mechanical properties are improved as much as possible.

Methods of making the moth eye surfaces are known in the art. Some methods use top-down techniques. There, each individual protuberance has to be manufactured. Say, by direct lithography. Or by using lithography made molds. Artificial moth eyes have been successfully manufactured that way last 50 years. Nevertheless, these can be found only in niche applications—in the most expensive precision optics. As this technique have major disadvantages—not scalable to big sizes, and expensive. Therefore, we do not see today moth eye type anti-reflective surfaces in architectural glass, automotive windshields, reading glasses, or laptop/smartphone screens.

Some methods use self-assembly techniques, sometimes referred as bottom-up (opposite to top-down). The self-assembly methods are preferable as they allow an economical production of these near-nano structures. In the art, self-assembly methods have been described. For example, the self-assembly of microspheres into a close packed monolayer on surface is described by Bin Ai, Ye Yu, Helmuth Möhwald, and Gang Zhang. "Novel 3D Au nanohole arrays with outstanding optical properties." Nanotechnology 24, no. 3 (2012): 035303. Also, in U.S. Pat. No. 9,690,012 "Anti-reflection structure and electric device", similar process is described. Near 200 nm sized spheres are placed into a densely packed single layer over the surface. To arrange the spheres that way, a version of Langmuir-Blodgett technique is used: the spheres are mixed with water or alcohol making a colloid. An substrate is submersed in the colloid. The substrate is slowly withdrawn from the colloid to use the fluid meniscus forces that form a monolayer of dense packed array of the spheres on the surface. Next, the spheres are fused into the surface to about the half of their diameter with a thermal treatment. Similar are also Kuksenkov application U.S. Ser. No. 14/648,075, and Adra Baca U.S. Pat. No. 9,272,947. This treatment can be called hydrothermal calcination, or other terms. In any case, the treatment means processing in water steam ambient at elevated temperature to facilitate fusing the spheres half way into the surface. In these conditions, water dissociates into hydroxyl and hydrogen thus facilitates fusing the small $SiO_2$ spheres into the glass at temperatures lower than the glass softening point.

This method has a disadvantage that the Langmuir-Blodgett technique to form the monolayer of the spheres needs slow withdrawal rate thus compromising the self-assembly technique and lowering throughput.

The art needs a method of an efficient forming of the moth eye morphology on an substrate. So, an economical manufacturing of the mechanically and optically advanced surfaces is enabled.

SUMMARY OF THE INVENTION

A substrate with surface is processed to improve its light reflectivity as the following.

A blanket film is deposited onto a surface of a substrate. The blanket film thickness is in a range 0.25-0.5 of a shortest wavelength of interest.

The pair of materials—the substrate and the blanket film are chosen to have dewetting property between them. For example, substrate is a silicate glass and blanket film is boron oxide.

The pair of materials—the substrate and the blanket film are chosen such that softening temperature of film blanket film is lower than softening temperature of the substrate. For example, the pair listed above.

A pattern of lines across the blanket film is formed. The thickness of the lines is smaller than the blanket film thickness. The pattern can be a honeycomb. A characteristic size of the honeycomb is 5 to 100 times bigger than the blanket film thickness. For example, the pattern is formed by mechanical scratching with a sharp needle.

The substrate with the blanket film is annealed at temperature above the softening point of the blanket film and below the softening point of the substrate.

During the annealing, the blanket film converts into structured film—an array of closely packed hemispheres. The converting is due to the dewetting phenomena. First hemispheres form next to the lines made on the blanket film. Then next rows of hemispheres forms until entire piece of the blanket film inside each honeycomb-bordered cell is converted into structured film.

DETAILED DESCRIPTION OF THE INVENTION $1^{st}$ Preferred Embodiment

A blanket, uniform in thickness film is deposited onto surface of a substrate. For example, on surface of a glass substrate.

The deposition technique can be chemical vapor deposition, sputtering, sol-gel, spin coating or any other convenient technique known in the art. While choosing the technique, space scale, cost, and throughput are taken into consideration.

The thickness of the blanket film chosen in a range ¼ to ½ of a shortest wavelength of interest. For visible spectra, the shortest is violet light—380-400 nm. Therefore, the blanket film is 100 to 200 nm. Next, blanket film is divided into honeycomb shaped islands. The characteristic size of the honeycomb is one to two orders of magnitude bigger than the blanket film thickness. The islands are separated by narrow gaps, less than film thickness wide. The gap lines are formed by film etching through the mask, or other techniques—sublimation by laser beam, mechanical scratching, etc.

Figure 1:
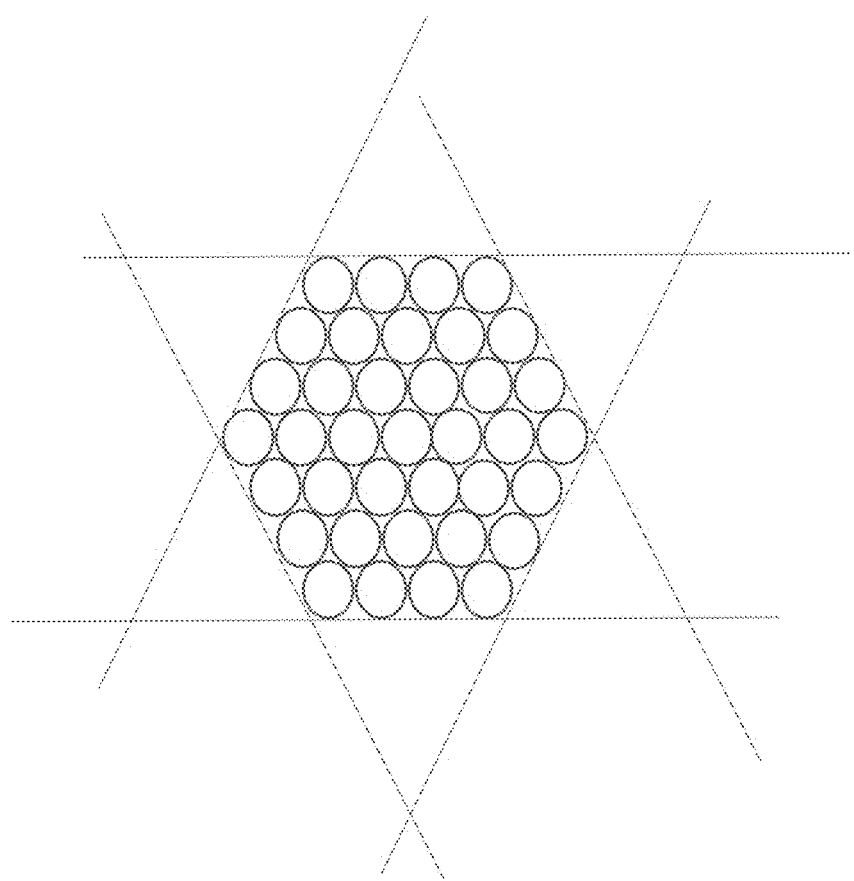
FIG. 1 shows a schematic cross-sectional view of evolution of the blanket film into structured film during thermal treatment according to an embodiment of the invention.
Figure 2:
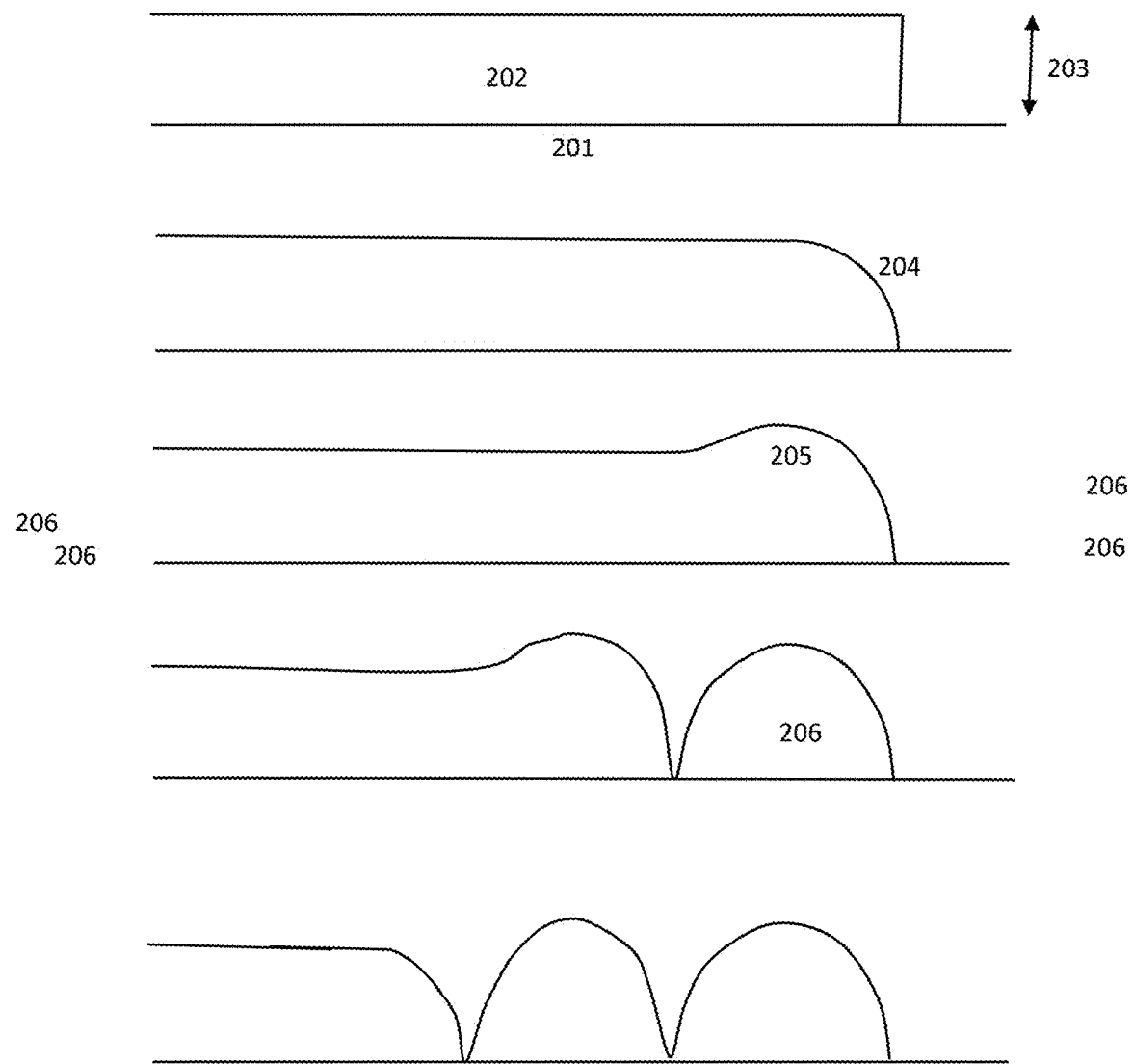
FIG. 2 shows a schematic cross-sectional view of the blanket film scribing pattern according to an embodiment of the invention.

Next, thermal processing step performed. Eventually the blanket film converts into structured film—an array of hemispheres with heights that is about 20 to 25% bigger than the blanket film thickness. FIG. 1 illustrates how the blank film sequentially evolves into the drop array during annealing. During the anneal step, the blanket film minimizes surface energy, the surface tension of the—forms hemispheres. Need to notice, the surface tension term is typically used to describe liquids. While we work here with solids. Still, understanding that a glassy state is a high viscosity liquid (and have all liquid properties as surface tension) would help to understand the method described here. A pair of substrate and film is chosen that the wetting angle of film drop exceeds 90 degree (i.e., non-wetting).

Thermal processing step is performed at temperature sufficient to initiate dewetting: above annealing point for the blanket film, and around blanket film softening point, when blanket film viscosity is between 105 to 109 poises. Ideally the temperature has to be below the annealing point of substrate. Though, in many cases it is enough if temperature is below softening point of substrate.

The pair of materials—the substrate and the blanket film are chosen to have a dewetting property between them. For example, substrate is silica and the blanket film is boron oxide. This specific pair is not ideal for practical applications, as boron oxide dissolves in water. However, after the boron oxide blanket film is converted into moth-eye-like structured film, it can be protected by deposition of a thin blanket film—less than 50 nm of $SiO_2$, $Al_2O_3$, $TiO_2$ or ITO (indium tin oxide). Artisan can determine whether each given pair of materials dewets—either from reference literature, or by a simple experiment—by observing a shape of melted drop after solidification.

The dewetting phenomena is related to a phase separation phenomenon. Therefore, the dewetting behavior can be predicted knowing immiscibility gap for given pair of oxides. As an example, glass from a mixture of silicon and boron oxides undergo phase separation if heated above about 800 C. Likewise, a blanket boron oxide film dewets $SiO_2$ surface and converts into a structured film.

When bulk borosilicate glass is annealed, the phase separation is spinodal, thus no moth eye pattern obtained. The substrate-blanket film system behaves differently. If the blanket boron oxide film on $SiO_2$ is thin enough, it is unstable and it divides into islands by binodal, not spinodal way. Minimizing a sum of $B_2O_3$ surface tension energy and $B_2O_3$—$SiO_2$ interface energy converts the blanket film into structured film an array of near hemispherical islands. Edge of the film becomes a starting point of transformation of the blanket film into structured film—the island pattern. A condition for binodal evolution is—surface tension of the blanket film is high, and the blanket film is thin. The initial blanket film transforms into structured film—an array of hemispheres. The hemispheres can be well separated from each other. It happens if the blanket film surface tension is very high, like in metals, the film is thin, and film/substrate interface energy is low. For example, if a thin Au (gold) blanket film is deposited onto $SiO_2$ and annealed, an array of small gold hemispheres is formed. The gold islands can be an order of magnitude smaller compared to distances between the islands. Thus, no close packed array is formed, no moth eye. It happens as surface tension of gold is much higher than Au—$SiO_2$ interface energy. An opposite case—the surface tension of the blanket film is low compared to film-substrate interface energy. In that case, upon annealing, the blanket film converts into spinodal pattern. Thus, the moth eye pattern is not achieved again, and improvement in reflectivity is not achieved.

Oxides typically do not have as high surface tension as metals. Also, the interface energy on oxide-oxide interface is typically smaller than the blanket oxide film surface tension, but not much. Therefore, in case of oxide blanket film like $SiO_2$ over oxide substrate like $Al_2O_3$, binodal transformation of initially blanket film happens upon anneal. And, the film thickness that results in close packed array of hemispheres can be made around 200 nm.

If the deposited blanket film is too thick, no well-ordered close-packed pattern will be obtained. The pattern might even become spinodal.

An example of the pure oxides that satisfy the set of moth eye requirements (200 nm-sized close packed array) is the $B_2O_3$ film over $SiO_2$. However, adding glass modifiers to the blanket film oxide, and to the substrate allows to get the desired 200 nm-sized close packed hemispherical pattern for many combinations of the substrate and the blanket film. Modifiers typically are alkaline metals (for the blanket film) and alkaline earth metals (for the substrate). If amount of the modifier is chosen away from optimal, the conversion of the blanket film into the structured film results in either and array of separated hemisphere islands, or in spinodal pattern.

The pair of materials—the substrate and the blanket film is chosen such that softening temperature of blanket film is lower than softening temperature of the substrate. For example, the pair listed above. One ordinary skilled in the art can find properties of interest for each given substrate-film pair—glass-softening temperatures, phase separate/dewetting, etc. using, for example Holand, Wolfram, and George H. Beall. Glass ceramic technology. John Wiley & Sons, 2012.

Another limitation for the blanket film composition comes from requirement to keep glassy state upon anneal when the blanket film is converted into structured film—the moth eye pattern. Many materials crystallize upon anneals. A very well studied case is SOI (silicon-on-insulator) technology. There, a silicon film covers $SiO_2$ topped substrate. Si does not wet $SiO_2$. If the Si film is thin enough—below 100 nm, anneals above 1100 C result in conversion of the continuous Si film into a hemisphere array, starting from wafer edge, see FIG. 3 as an example. This phenomenon is purely undesirable for SOI, thus it was studied only from a point to suppress this effect. As Si tends to crystallize, eventual shape of islands are truncated pyramids, not hemispheres. Therefore, it is preferable to design at least blanket film compositions using glass modifiers because it helps to keep glassy state. Pure oxides tend to crystallize upon thermal treatments, thus upon transforming the blanket film into structured one, we might get crystal faceted protuberances instead of desired hemispheres.

To minimize the reflection, the protuberance shape should result in linear change of reflective index from bottom to top of the protuberance. This requirement is satisfied by paraboloid shape of the protuberances, see for example p. 665 in Stavenga, D. G., S. Foletti, G. Palasantzas, and K. Arikawa. "Light on the moth-eye corneal nipple array of butterflies." Proceedings of the Royal Society B: Biological Sciences 273, no. 1587 (2005): 661-667. Biological species have the parabolic shape, while dewetting results in a shape closer to hemispherical. Therefore, the reflectivity of the hemispherical arrays is limited to about 0.2%, (and, thus light transmission is limited to below 99.8%) while biological moth-eyes show well below 0.1% reflectivity, and higher transmission as well. Fortunately, another useful property of the structured film having nipple array surface—low reflectivity in wide range of light incident angles—less depends from the nipple shape. Thus, the anti-reflective properties of our artificial moth-eye-like surfaces keep from 900 down to about 200 of light incident angles. Also, low reflectivity in wide range of wavelengths is in both, true (parabolic) moth eye, and in moth-eye-like (hemispherical) patterns. At least, both 200 nm-sized patterns cover entire visible spectra.

$2^{ND}$ Preferred Embodiment

The most valuable applications of anti-reflective surfaces—phone or laptop screens, camera optics, semiconductor lithography tools, reading glasses, automotive wind shields, etc. are on glasses. Commercially available glasses are mixtures of oxides—silicon, aluminum, boron, sodium, lithium, and other oxides. While many given pairs of oxides are not miscible. Glasses containing immiscible oxides—as mentioned before case—SiO2 and B2O3 are metastable. Knowing immiscibility gap the glass can be heat treated to achieve phase separation. Artisan can determine whether the given pair of oxides will phase separate by using, for example, Gutzow, Ivan S., Oleg V. Mazurin, Jürn WP Schmelzer, Snejana V. Todorova, Boris B. Petroff, and Alexander I. Priven. Glasses and the glass transition. John Wiley & Sons, 2011. Phase separation indicates low interface energy for the given pair of oxides. For the same pair of oxides, if one them is deposited as a blanket film, it would mean that the surface tension of the film will create instability in the film, and the film will undergo patterning either binodal or spinodal way. Thinner blanket film will convert into hemispherical islands, space separated, medium thick blanket film will convert into the close packed hemispherical pattern, and as soon as the blanket film thickness exceeds the thickness that is needed to form the close packed pattern, the conversion results in non-ordered array, sometimes spinodal (worm-like), which is undesirable. Thus, to create the correct moth-eye like pattern, several conditions must be satisfied.

The higher surface tension of the blanket film oxide is, the thicker will be the close packed hemisphere pattern. While for the antireflection in visible light, the characteristic size of the hemispheres must always be around 200 nm. If the size is 100 nm, the reflectivity will be >1%—as the height of the hemisphere is insufficient to create a smooth transition from air refractive index 1.0 to substrate refractive index (about 1.4). At 50 nm size the antireflective effect basically disappears. For 300 nm size the surface will have high reflectivity for shorter wavelength (violet) light.

Therefore, to achieve good antireflection properties of the surface, the composition of the glassy blanket film has to be optimized. For example, let us consider a case if one uses a substrate with high aluminum content alumosilicate glass. It is a high temperature glass. And, a blanket film of soda lime glass is deposited. The soda lime is low temperature glass. Thus, no risk of substrate sagging, while anneal temperature is enough to convert the blanket film into the moth eye pattern. In this case, low sodium and calcium content will result in higher surface tension of the blanket film material, and the resulting moth eye hemispheres can reach desired 200 nm size. On the other side, if calcium and sodium content is high, the surface tension is low, and the blanket film tends to spinodal patterning, no hemispheres formed. Optimal composition contains sodium in a range 0-12% and calcium in a range 2-9%. Other than soda lime blanket films can be used. If blanket film is borosilicate, boron is optimized in 5-19% range.

$3^{RD}$ Preferred Embodiment

Same dewetting and phase separation phenomena are observed for polymers. Therefore, the self-assembly patterning to create an anti-reflective surface potentially can be designed for polymer-on-polymer, for polymer-on-glass, or for polymer-on-crystal substrates.

Earlier (for the first time), the blanket film conversion into a structured film having island array (and into spinodal pattern as well) was observed on polymers—Coveney, Sam. Fundamentals of Phase Separation in Polymer Blend Thin Films. Springer, 2015. Early findings were on block copolymers, but later the effect have been observed on simple polymers. Example is PPMA on glass. Important here is an observation that the conversion of blanket polymer films into structured film having islands result in hemispherical shape of the islands. Though, having hemispherical islands is not enough to achieve anti reflective properties. Again, the film-substrate pair has to be chosen with proper values of blanket film surface tension and proper film-substrate interface energy.

Here we consider an exemplary case of polymer-on-glass. The polymers are typically soften at lower temperature than glasses, thus one of requirements—lower softening point for blanket film compared to substrate—is automatically satisfied.

Also, it is much easier to satisfy the dewetting requirement. If the polymer is mostly hydrophilic—like PMMA, then the substrate surface adjusted to become hydrophobic. For example, fluorinated glass surface (by any convenient technique as submerge into HF ambient), or use fluorine containing glass (entire glass piece or only film on surface), etc. If the polymer if hydrophobic—like Teflon, the substrate surface has to be turned more toward hydrophilic. For example, pour the glass piece in an alkaline bath—water/ammonia, etc. before depositing the blanket polymer film.

Requirement to deposit right blanket film thickness—150 nm is also easy. Making honeycomb patter lines over the blanket polymer film is also technically easy. It can be done similar way as in the $1^{st}$ embodiment.

Thus, only requirement left—choose proper surface tension. Most of polymers have surface tension in a range 30-50 mN/m (milliNewton/meter) except of fluorine containing ones (Teflon, etc.)—below 20 mN/m. This is lower than typical surface tension of glasses, and much lower than mercury, silicon, or water surface tension. As we saw before, too high surface tension materials are not fit for moth eye. While the surface tension of polymer is rather too low. 100 mN/m is good for making the desired 200 nm sized pattern. Also, the surface tension usually lowers with temperature, so the known table data from references is not very helpful to choose right polymer.

PMMA blanket film on a hydrophobic substrate is an easy example. Failures in 30-50 years ago semiconductor lithography—at 250 nm and above nodes is related to this—too high photoresist bake temperature, or too high exposure brightness. There, the PPMA became patterned, and did not behave as a photoresist.

Experimentally, moth eye structured film from blanket PMMA film on soda lime substrate works reasonably well. Annealing step is in 300 C range.

Likely, it would be possible to create moth eye from many other polymers.

$4^{TH}$ Preferred Embodiment

First, the hexagonal set of lines is scribed on the initial blanket film on substrate. Before that, the substrate surface is modified to obtain desired level of hydrophobicity or hydrophilicity—to facilitate further dewetting by the blanket film to be deposited. Than a liquid organic monomer or mixture of the monomer and solvent is deposited onto the surface with spin coating technique to get desired thickness. Than the solvent is evaporated, and the substrate/film stack is stored until the blanket film converts into the moth-eye like structured film due to dewetting. Than the structured film is polymerized with ultraviolet curing.

One ordinary skilled in the art can choose proper organic compound to satisfy requirements of mechanical wear resistance of the final moth-eye structured film, UV curability, spin coating conditions to obtain desired blanket film thickness, hydrophilicity adjustment of the surface of the substrate so the wetting angle by structured film is near 90 degrees, etc.

$5^{TH}$ Preferred Embodiment

Figure 3:
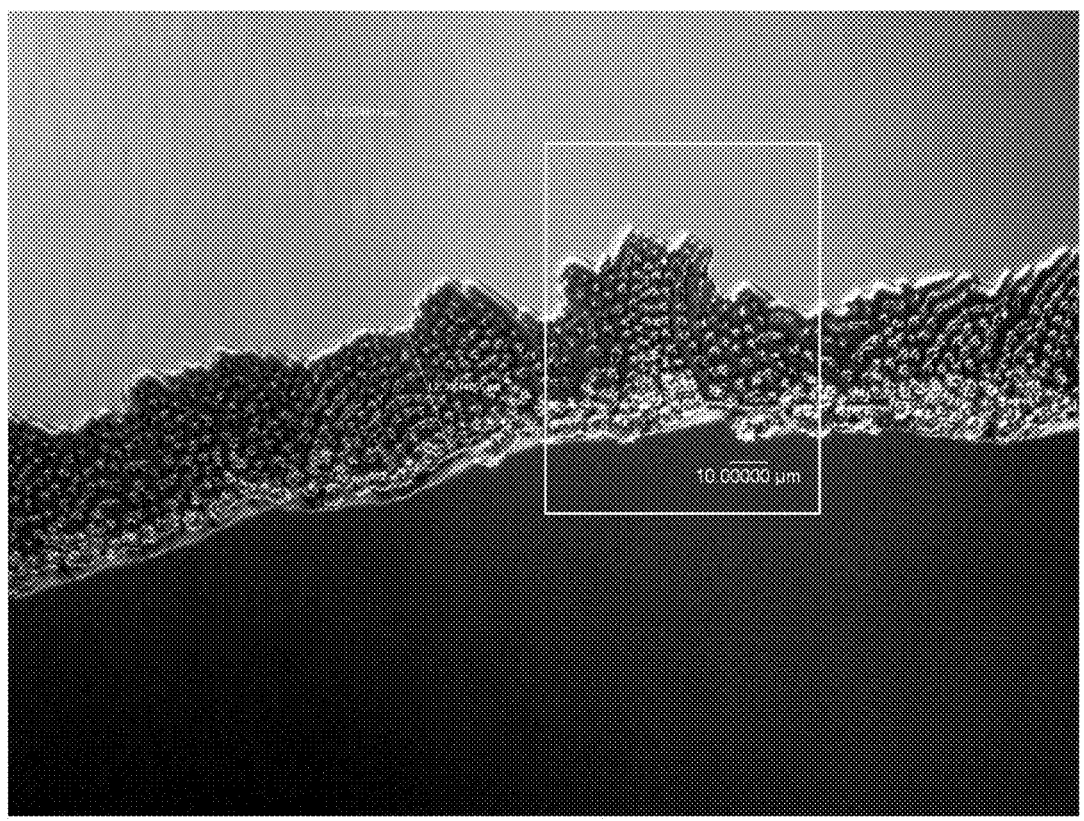
FIG. 3 shows a photo of self-formed near close packed array of protuberances, silicon on silicon dioxide.
Figure 3:
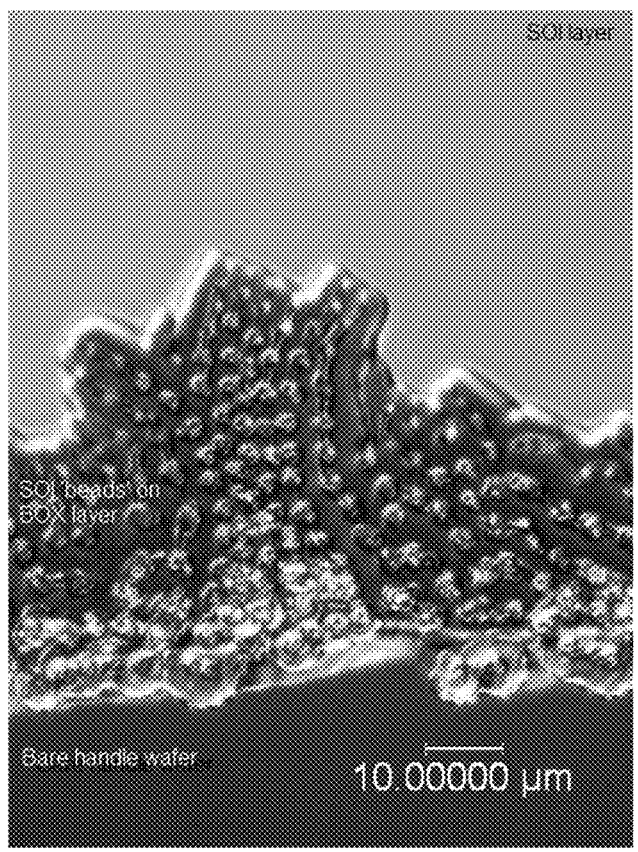

As mentioned above, metals have typically high surface tension, thus the metal blanket films convert into bigger scale—micron-sized moth-eye-like structures when we use thin blanket film instability to convert it into the regular drop array structured film. An example on FIG. 3 shows a silicon drop array structured film near the edge of SOI wafer. The top silicon blanket film becomes unstable at >1100 C and dewet silicon dioxide film below. The annealing here done in oxygen free ambient, so silicon cannot oxidize. The drops are about 5-micron size average. At melting temperature, the silicon surface tension is 0.8 N/m that is about 30 times higher than surface tension of typical polymer and near order of magnitude higher than typical surface tension of metal oxides. Surface tension of solid silicon is hard to measure; it is only known that surface tension drops with temperature (Hardy, S. C. "The surface tension of liquid silicon." Journal of crystal growth 69, no. 2-3 (1984): 456-460). Therefore, efficient "surface tension" for SOI annealing case is probably above 1 N/m. This illustrate a general clue—to get desired size—200 nm—droplets, the blanket film surface tension has to be roughly 0.1 N/m. Well, difference between surface tension of blanket film, and interface energy of film/substrate. Oxides typically have about right (for anti-reflective moth eye) surface tension, while for polymers and for metals their natural surface tension make it more difficult to make the desired sized moth eye morphology.

To fabricate the moth-eye-like antireflective surface from metal films, two adjustments are needed. First, put a very thin film of surfactant over the blanket metal film. Second, oxidize the metal after converting the blank metal film into the structured film drop array. Oxidizing is needed as the metal typically is not translucent to light.

For the case of silicon blanket film over $SiO_2$, a thin antimony film is deposited over the Si—to serve as the surfactant. The silicon film thickness is chosen near 100 nm. Upon annealing in hydrogen or argon at above 1100 C, the blanket film converts into the structured film—drop array which is not close packed, the drops are distanced by about 100 nm. Next, oxidation is performed. Silicon drops become SiO$_2$ drops. Size of the SiO$_2$ drops are bigger as compared to initial Si drops by 2.17. Therefore, the array becomes near close packed.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. Method for reducing reflectivity of optical articles comprising a substrate and a film on surface of said substrate
said film is a blanket film deposited on said substrate characterized in that
said blanket film is post processed with 2 steps
where the said first step comprises dividing the continuous film by lines into cells with a honeycomb pattern and the said second step comprises thermal treatment so each honeycomb cell of blanket film transforms into a structured film having near close packed array of near hemispherical protuberances.

2. Method of claim 1 where
thickness of said film is 2.5 times smaller than the shortest wavelength in a wavelength range where reflectivity has to be reduced.

3. Method of claim 1 where
Method of claim 1 where said dividing the said blanket film into honeycomb cells comprises scribing the film by mechanical, laser or other means.

4. Method of claim 3 where
width of said scribe lines is smaller than ½ of the shortest wavelength in said wavelength range of interest.

5. Method of claim 1 where
side length of said honeycomb cell is 4 to 100 times bigger than the diameter of said hemispherical protuberances.

6. Method of claim 1 where
pair of said substrate and said blanket film are chosen such that the film dewets the substrate.

7. Method of claim 6 where
said substrate/film pair comprises 2 different metal oxide glasses.

8. Method of claim 7 where
said pair comprises said substrate made of silicate glass and said film made of boron oxide glass.

9. Method of claim 1 where glass softening temperature of said substrate is higher than said film.

10. Method of claim 1 where
said thermal treatment is performed at temperature sufficient to cause film dewetting over substrate, and lower than softening point of substrate.

* * * * *